United States Patent [19]
Janka

[11] Patent Number: 5,238,666
[45] Date of Patent: * Aug. 24, 1993

[54] PROCESS FOR SEPARATING SULFUR COMPOUNDS FROM FLUE GASES

[75] Inventor: Pentti Janka, Tampere, Finland

[73] Assignee: Oy Tampella AB, Tampere, Finland

[*] Notice: The portion of the term of this patent subsequent to Dec. 31, 2008 has been disclaimed.

[21] Appl. No.: 745,509

[22] Filed: Aug. 15, 1991

Related U.S. Application Data

[63] Continuation-in-part of Ser. No. 473,435, Feb. 1, 1990, Pat. No. 5,077,024.

[51] Int. Cl.$^5$ .............. C01B 17/00; C01B 17/22
[52] U.S. Cl. .............. 423/244.07; 423/243.08; 423/244.05; 423/244.08
[58] Field of Search ......... 423/244 A, 244 R, 243, 423/243.08, 244.05, 244.07, 284.08

[56] References Cited

U.S. PATENT DOCUMENTS

| | | | |
|---|---|---|---|
| 4,185,080 | 1/1980 | Rechmeier | 423/242 |
| 4,388,281 | 6/1983 | Hölter et al. | 423/210 |
| 4,590,049 | 5/1986 | Staudinger | 423/242 |
| 4,753,785 | 6/1988 | Kister | 423/242 |
| 4,788,047 | 11/1988 | Hamala et al. | 423/244 |
| 4,867,955 | 9/1989 | Johnson | 423/244 A |
| 4,891,194 | 1/1990 | Kubisa et al. | 423/244 A |
| 5,077,024 | 12/1991 | Janka | 423/244 A |

*Primary Examiner*—Gregory A. Heller
*Attorney, Agent, or Firm*—Dressler, Goldsmith, Shore, Sutker & Milnamow

[57] ABSTRACT

A process for desulfurization of fuel combustion gases and a new reactor wherein the primary flue gas stream containing sulfur oxides and alkaline oxide solids flows into the reactor vessel. A plurality of baffle columns is positioned at the top of the reactor vessel which serve to separate the primary stream into a plurality of first streams containing substantially all of the alkaline oxide solids and a plurality of second streams comprising substantially solids-free gas. The first streams are wetted after which they recombine with the second streams to produce reaction product sulfates and sulfites. The reaction product is substantially dry because the hot second streams cause evaporation of substantially all of the moisture from the wetted first streams.

10 Claims, 5 Drawing Sheets

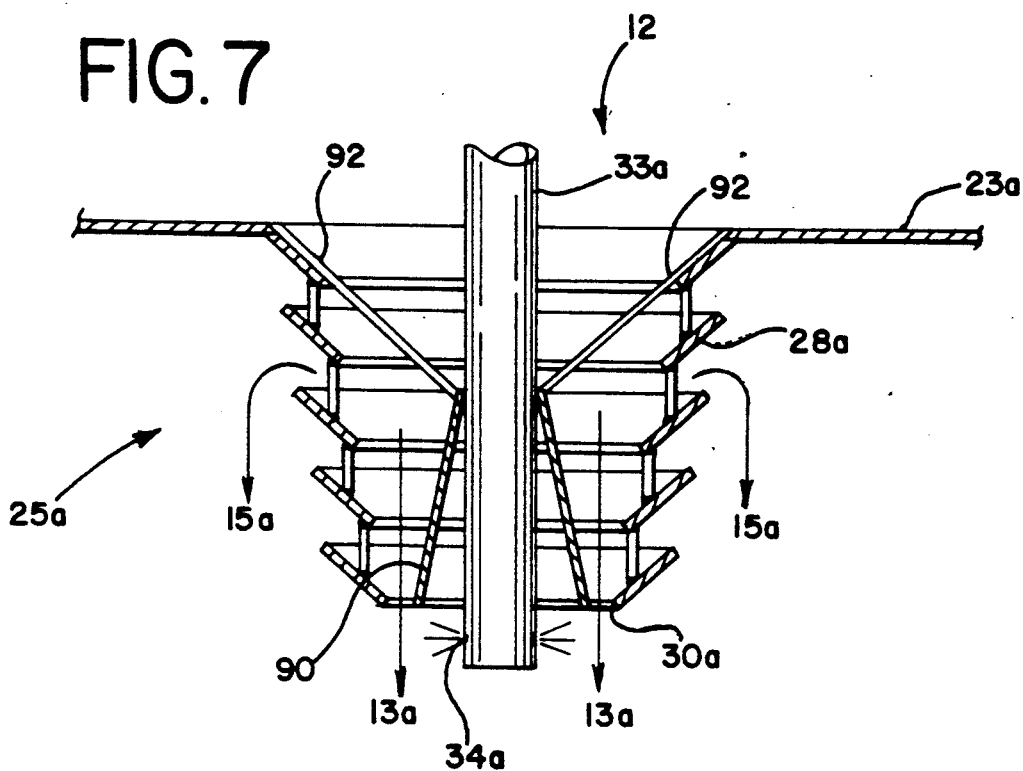
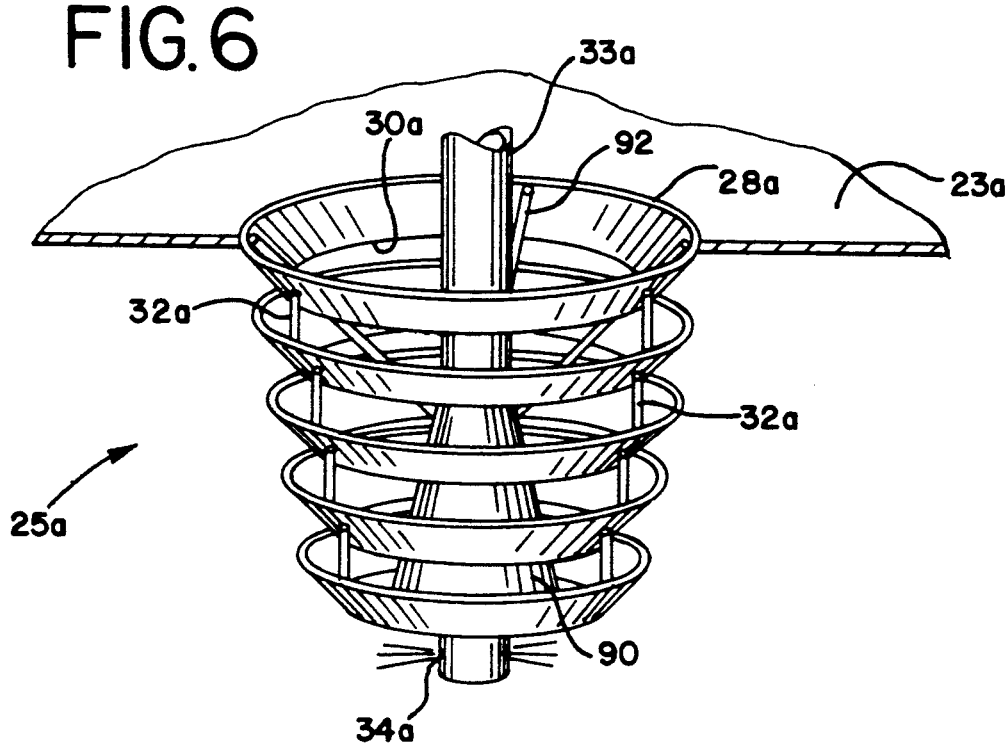

PROCESS FOR SEPARATING SULFUR COMPOUNDS FROM FLUE GASES

This application is a continuation-in-part of application Ser. No. 473,435, filed Feb. 1, 1990, entitled Method and Apparatus For Wetting The Particles Contained In A Gas Flow, issued Dec. 31, 1991 as U.S. Pat. No. 5,077,024.

TECHNICAL FIELD

This invention relates to apparatus and processes for the removal of sulfur compounds, and particularly sulfur oxides, from the flue gases of organic fuel combustion and, more particularly, to a reactor and systems incorporating the reactor that increase the efficiency of such sulfur removal processes.

In U.S. Pat. No. 4,788,047 (owned by the assignee of the present application), there is disclosed a complete system and process for removing sulfur compounds from combustion flue gases. In general, that process comprises the feeding into the furnace of a finely powdered reagent, preferably calcium carbonate, that is calcinable in the furnace to form calcium oxide. The calcium oxide partially reacts with the sulfur oxide gases of combustion to form a certain amount of calcium sulfites and/or sulfates. The flue gases leaving the furnace thus contain varying amounts of calcium oxide particulates, calcium sulfites and/or sulfates, sulfur oxides (mainly sulfur dioxide) and fly ash. That flue gas mixture is fed directly to a reactor or, alternatively, first to a filter means for removing the fly ash and then to a reactor. In either case, the flue gas mixture is hydrated in the reactor so that the calcium oxide is converted to calcium hydroxide which is highly reactive with sulfur dioxide to form calcium sulfate. Under controlled conditions of gas flow and hydration, the sulfate products are readily removed as a dry powder and the flue gases are emitted to atmosphere cleansed of most of the noxious sulfur oxides. The efficiency of the foregoing process and other similar processes (see, for example, U.S. Pat. Nos. 4,185,080; 4,388,281; 4,590,049; 4,753,785) depends, in large measure, on the thoroughness with which the calcium oxide particles in the flue gases are wetted in the reactor so that the ensuing reactions with sulfur dioxide take place effectively and produce a substantially dry powdered waste product.

The problem of thoroughly wetting the solids contained in the flue gases was addressed in the aforesaid co-pending application, Ser. No. 473,435. There is there disclosed a means for separating the primary flue gas stream containing the described solids into two streams, one containing substantially all of the solids and the other comprising substantially solids-free gases. The means there disclosed comprises a reactor vessel having a series of vertically spaced downwardly-directed grids or louvers. As the primary flue gas stream encounters the louvers the baffling effect causes a part of the gases to flow outwardly between the louvers towards the outer wall of the reactor vessel and then downwardly between the wall and the louvers. At the same time, the rest of the gases, which can be described as the solids-laden stream, flow downward through the central channel formed by the louvers. As the central, solids-laden stream leaves the series of louvers, it is thoroughly wetted by water spray means to form calcium hydroxide. The wetted stream is then joined by the relatively non-wetted, and still hot, gas stream to effect the desired reactions between the calcium hydroxide and sulfur dioxide. As described in said application, the separated solids-laden stream can be thoroughly wetted without causing the reaction products to form an undesirable and difficult to handle wet slurry.

The major objectives of desulfurization processes of the type with which the present invention is concerned are (1) to remove the highest percentage of sulfur oxides from the combustion flue gases at the lowest relative cost, and (2) to produce a dry and powdery end product which is easy to handle and readily disposable as waste. The invention of the aforementioned copending application has made substantial advances of the art toward those objectives. By separating the primary stream of combustion gases with a series of angled louvers into a first stream containing substantially all of the particulates and a second stream substantially free of particulates, it is possible to completely and thoroughly wet the particulates in the first stream without the requirement of precise temperature and water spray controls. This is made possible because the downstream combining of the thoroughly wetted particles with the still hot gas stream results in enhanced chemical reactions and evaporation of substantially all of the water. The end product thus is the desired powdery and substantially dry sulfates and sulfites.

It has now been discovered how to further improve the efficiency of the described reactors and desulfurization processes, and the present invention comprises an improved result over that obtained when using the reactor disclosed in the earlier filed application Ser. No. 473,435.

SUMMARY OF THE INVENTION

The present invention provides a reactor which further improves the efficiency of the sulfur oxide-calcium hydroxide reactions occurring therein resulting in an increased percentage of sulfur oxides being removed from the combustion flue gases. The invention also provides a desulfurization process incorporating the reactor which process results in improved efficiency and easy to handle, substantially dry, waste products.

Briefly, the improved reactor comprises a plurality of baffle columns positioned near the top of the reactor vessel, which columns essentially span the upper cross-sectional area of the reactor. Each of the columns comprises a stack of vertically spaced baffle plates. The baffle plates are in the form of inverted, frusto-conical plates that may be partially nested or overlapping in the vertical direction. The frusto-conical plates preferably have a diminishing central bottom opening and gradually taper or decrease in base diameter from the top to the bottom of the column. When the flue gas with entrained particulates from the furnace flue enters the reactor it must pass through the multiple baffle columns. Each of the baffle columns is effective to separate that primary stream into two streams. The first stream comprises substantially all of the solids and flows vertically downward through the aligned central openings in the baffle plates as a result of the greater inertia of the solids. At the same time, the second stream, which is substantially free of solids, flows upward and outwardly through the angled spaces between the baffle plates toward the reactor sidewall and downwardly toward the bottom of the reactor.

A water spray nozzle is positioned beneath each baffle column in substantial registry with the column's central opening. As the first, solids-laden stream exits the central opening in the column, the solids are thereby thoroughly hydrated by the water spray to convert substantially all of the stream's calcium oxide to the desired reactive hydroxide. Downstream of the spray nozzles, the wetted solids combine with the second hotter stream of solids-free gases resulting in the reactions between the hydroxides and sulfur oxides present in both streams to produce the desired calcium sulfates and sulfites. With suitable controls of temperature and water spray rate, the moisture is substantially completely evaporated and the end product is a fine dry powder which falls to the bottom of the reactor and is collected for further handling.

Each baffle column is effective to separate the primary flue gases stream into the two streams as described. However, it has been found that presence of a plurality of baffle columns serves to increase even further the efficiency of the reactions and removal of sulfur oxides. In this respect, it is believed that the multiple solids-free gas streams being produced collide with one another and the resulting turbulence of those streams enhances the chemical reactions.

The invention also comprises a complete system or process for desulfurization of flue gas of the type shown in the aforementioned U.S. Pat. No. 4,788,047 with the improved reactor incorporated therein. The reactor thus comprises means at the bottom of the vessel for collecting the dry powder reaction product and flowing the gas stream downstream for further treatment. Conveyor means is associated with the reactor for recycling portions of the collected dry powder back into the primary flue gas stream to thereby utilize unreacted calcium oxides and hydroxides. The gas stream leaving the reactor is directed to filtering or precipitating means for removing and collecting fly ash and associated sulfates/sulfites before the gas is discharged to atmosphere. Portions of the collected fly ash and sulfates/sulfites can likewise be pumped back into the primary flue gas stream, preferably near the entrance to the baffle columns.

Numerous other advantages and features of the present invention will become apparent from the following detailed description of the invention, from the claims and from the accompanying drawings.

BRIEF DESCRIPTION OF THE DRAWINGS

In the accompanying drawings forming part of the specification, and in which like numerals are employed to designate like parts throughout.

FIG. 6 is a perspective view of another preferred embodiment of the baffle column and water spray means;

FIG. 7 is a vertical sectional view of the baffle column of FIG. 6; and

DETAILED DESCRIPTION OF THE INVENTION

Figure 1:
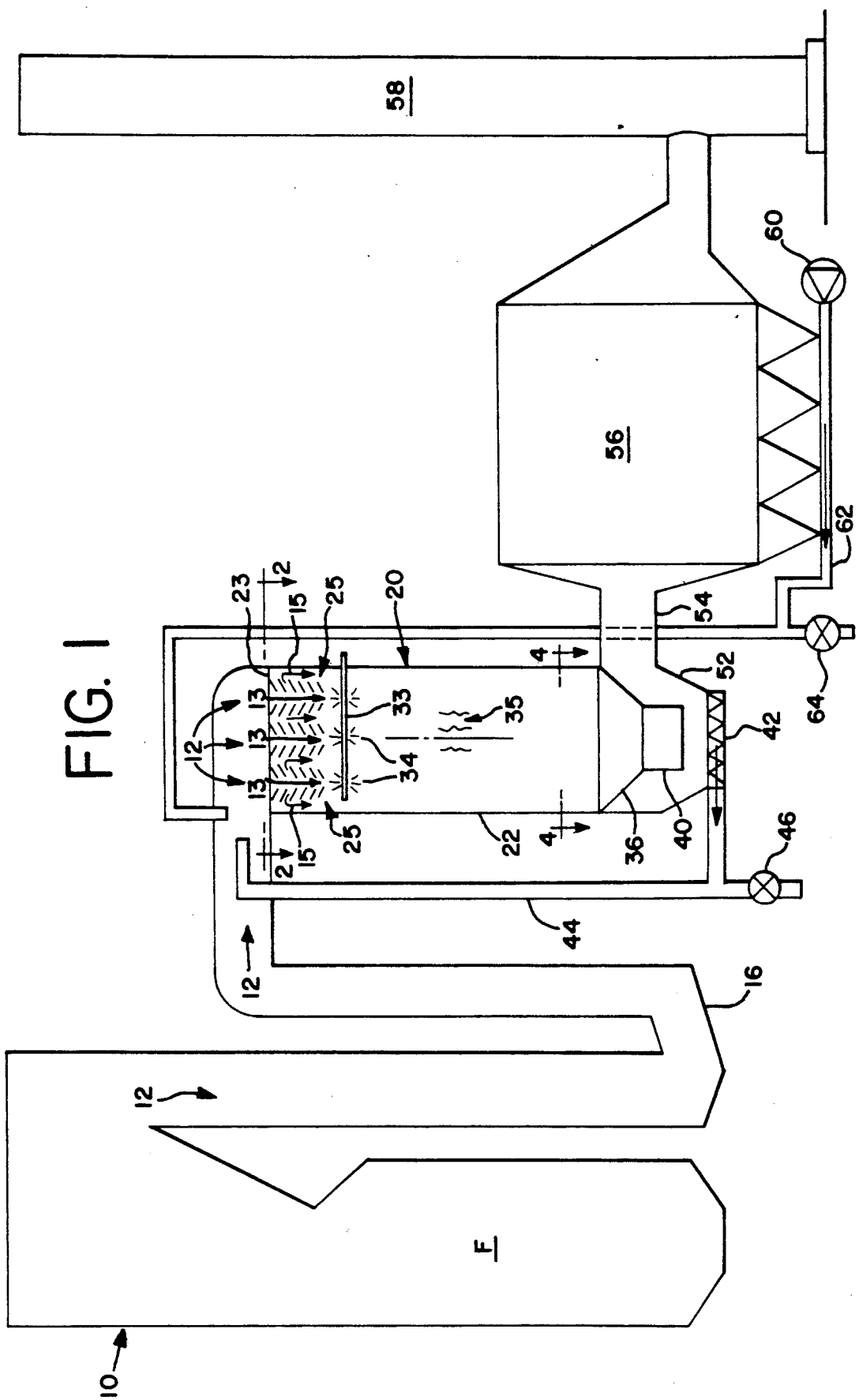
FIG. 1 is a diagrammatic elevational view, partially in section, showing a desulfurization system and process embodying the principles of the invention.

Referring more particularly to FIG. 1 of the drawings, there is illustrated a furnace F and a system and process for desulfurizing the combustion gases of the furnace in accordance with the invention. An alkaline forming reagent, preferably pulverous or finely powdered calcium carbonate, is fed or blown into the furnace F at a point above the firebed, such as at 10. The calcium carbonate is quickly calcined to calcium oxide which is mildly reactive with the sulfur oxides resulting from the combustion of the fuel in the furnace. A primary stream 12 of combustion products exits from the furnace F through a flue pipe 16, and said primary stream includes sulfur dioxide gas and solids of calcium oxide and fly ash.

Figure 2:
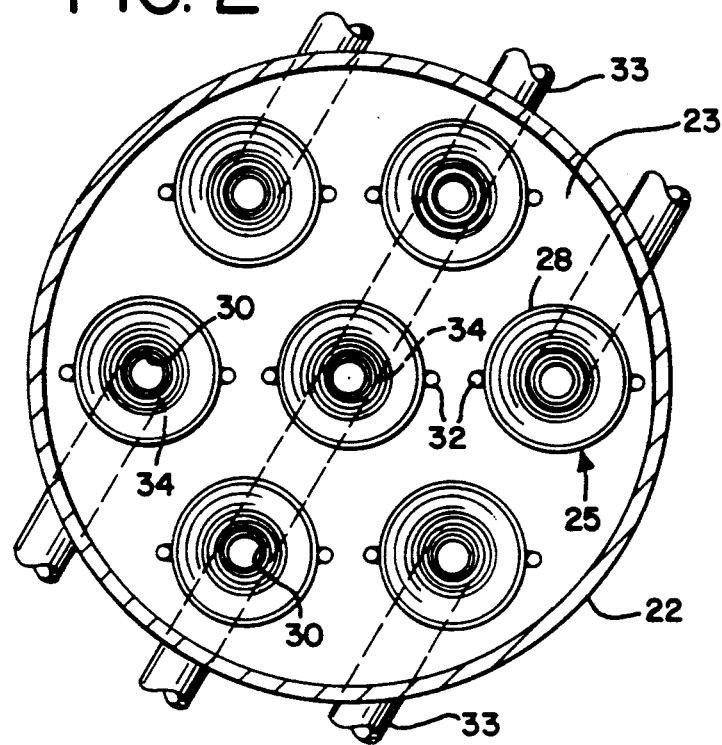
FIG. 2 is an enlarged sectional view on the plane of line 2—2 in FIG. 1.
Figure 3:
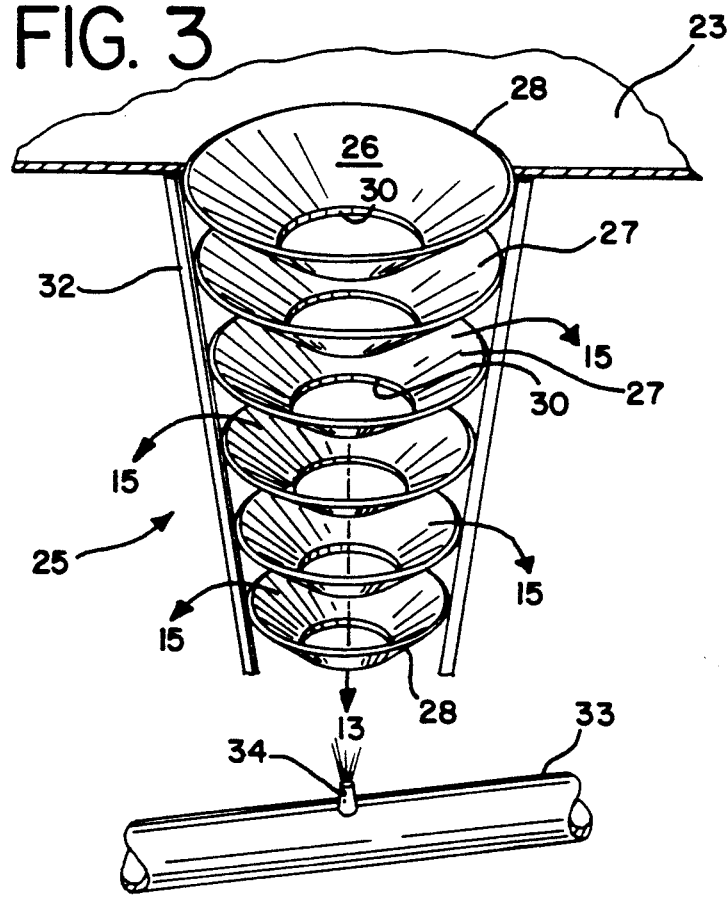
FIG. 3 is an enlarged perspective view of a baffle column of the reactor.

Flue pipe 16 communicates with the top of a reactor indicated generally by the reference numeral 20. The reactor 20 comprises a generally cylindrical vessel 22 having an upper roof or apertured panel 23. A plurality of baffle columns 25 is mounted in the vessel 22 adjacent the top thereof and depend from the panel 23 so that the primary stream 12 entering the reactor from the flue pipe 16 is directed to flow through the columns. In the embodiment of the invention illustrated, there are seven of said baffle columns (see FIG. 2), substantially filling the cross-sectional area of the reactor. More or less of the columns may be employed, depending upon the size and capacity of the system, the size of the columns, and the dimensions of the reactor 20. As discussed in detail hereinafter, the columns function to divide the primary stream 12 into separate streams flowing through each of said columns consisting of a first stream 13 containing substantially all of the particulates and solids of a portion of the primary stream 12 and a second stream 15 that is substantially free of particulates and solids Referring particularly to FIG. 3, it will be seen that each of the columns 25 comprises a stack of vertically spaced baffle plates 26. The baffle plates 26 consist of inverted, open frusto-conical plates 28 whose base diameters decrease from the top to the bottom of the stack. Each plate comprises a central opening 30 and the openings 30 of all baffle plates in the stack are of equal or diminishing diameter, but provide a passageway having a diminishing cross-sectional area through the stack. The individual baffle plates 26 are connected together by suitable connector rods 32, 32 and the plates may be partially nested so that the base or top edge of each plate partially overlaps vertically the plate immediately thereabove.

Water spray means, such as water supply pipes 33 and nozzles 34, are positioned in the vessel 22 beneath the baffle columns and in close adjacency therewith. In the embodiment illustrated in FIGS. 1 and 2, there are seven spray nozzles 34, each being in substantial vertical registry with an associated column's aligned central opening 30.

The bottom of the vessel 22 comprises a frusto-conical plate 36 provided with a central opening 38. A cylindrical mantle 40 depends from the plate 36 for directing solid reaction products falling through the opening 38 to a conveyor means 42. Conveyor means 42 communicates with the flue 16 through line 44 for recirculating solid reaction products back into the primary combustion products stream 12. These solid reaction products generally include some unreacted oxides and hydroxides that can be useful in continuing operation of the process. The line 44 is also provided with a take-off valve 46 for directly removing solid reaction products for disposal as desired.

Figure 4:
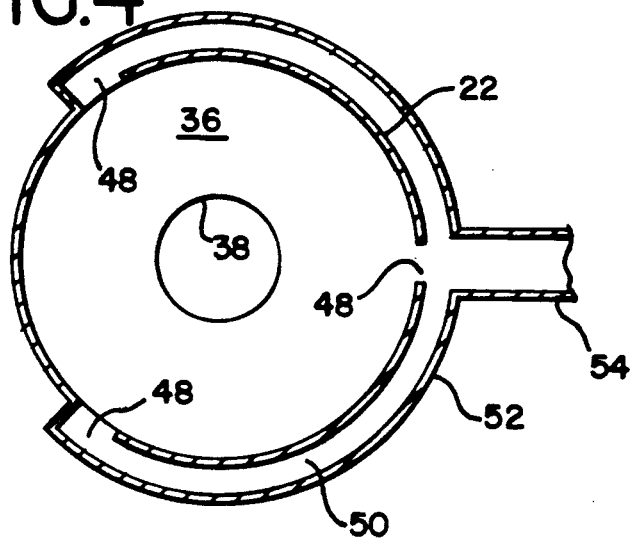
FIG. 4 is a sectional view on the plane of line 4—4 in FIG. 1.

As seen in FIG. 4, the vessel wall 22 is provided adjacent the bottom thereof with gas exit ports or outlet openings 48. The openings 48 communicate with a horizontal channel 50 formed between a jacket 52 applied to the vessel bottom and the reactor vessel 22. The gases flow from the reactor 20 through said openings 48 and channel 50 through a line 54 to an electrostatic precipitator 56, or other similar filter means, for removing fly ash and remaining reaction product solids from the gases. These solid reaction products generally consist of around 50% fly ash and 50% sulfates plus any unreacted $CaO + Ca(OH)_2$ which ratio is subject to substantial variation. The cleaned gases are then discharged to atmosphere through a stack 58. A blower 60 is associated with the precipitator for recirculating the solid products through line 62 back to the primary combustion products stream 12 in the flue 16. The line 62 is also provided with a take-off valve 64 for directly removing solids for disposal as desired.

Test results have demonstrated that there is a significant increase in the efficiency of the desulfurization process, on the order of 20-30% greater sulfur removal with the use of the novel reactor 20 and thus with such a reactor the sulfur removal capacity of the whole process rises to 75-85%. This increase may be explained as follows. When the primary stream 12 enters the reactor 20, it is forced to flow through the array of baffle columns 25. Each of the baffle columns functions generally in the manner described in the aforementioned copending application Ser. No. 473,435. Essentially, each column 25 causes the portion of the primary stream 12 directed thereto to divide into two streams: (1) a first stream 13 that contains substantially all of the particulates and solids, and (2) a second stream 15 that comprises gases that are substantially free of particulates and solids. The first stream 13 flows through the central openings 30, while the second stream 15 is deflected by the baffle plates 26 and caused to flow outwardly through the spaces 27 between said plates. Each stream 13 exiting from a column 25 can then be thoroughly wetted by the associated spray nozzle 34. As the wetted, solids-laden stream 13 continues downstream, it merges again with the second, essentially solids-free gas stream 15 to form a combined third stream 35 where the desired reactions occur between the calcium hydroxide and sulfur dioxide.

It has been determined that the temperature of the primary stream 12 entering the reactor 20 is on the order of 150° C. (the temperature of the flue gases fed into the reactor can range from 50°-800° C., but preferably between 120°-200° C.), and this temperature is substantially maintained in the second stream 15. After thorough wetting, the temperature of the stream 13 is reduced to around its dew point, or approximately 45°-55° C. When the streams 13 and 15 combine, the desired reactions occur and the hot stream 15 also causes substantially complete evaporation of the moisture. The temperature of the combined stream 35 leaving the reactor is raised above the dew point, to around 55°-65° C. The reaction product of sulfates and sulfites is a substantially dry powder which is easy to handle for disposal or recirculation back to the primary stream 12. It is also believed that the presence of a plurality of baffle columns and hot gas streams 15 causes said streams to collide and create turbulence which enhances the reactions occurring in the reactor. As aforementioned, the novel described process results in an increased percentage of sulfur being removed, which is on the order of 85%.

Figure 5:
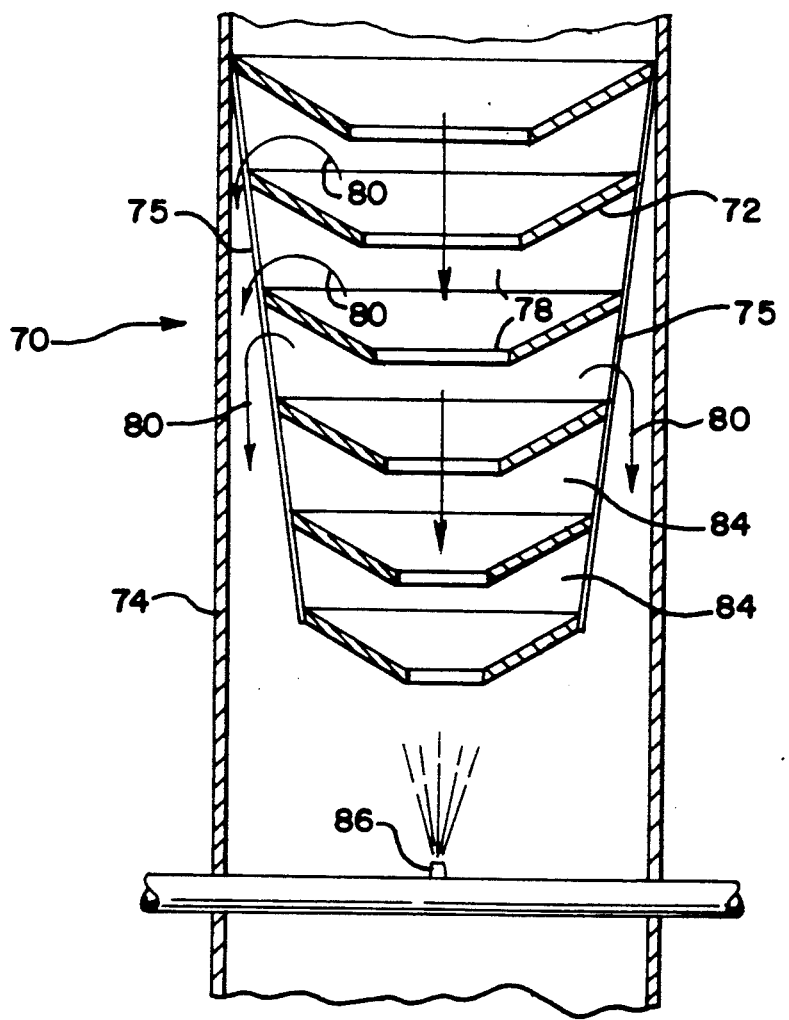
FIG. 5 is a cross-sectional view of a reactor in which a single column of vertically spaced baffle plates is employed.

In FIG. 5, there is illustrated a reactor 70 which includes a single column of vertically spaced baffle plates 72 that are suitably affixed in position relative to the reactor wall 74 and maintained in its relative vertical position as by welding with rods 75. While plates 72 are of constantly decreasing diameter they need not be nested since this relationship is not critical to practicing the invention. The particulate stream 76 flows through the central opening 78 and the substantially particulate-free gas stream 80 flows through spaces 84 towards the wall 74 and downward. The particulate stream 76 is wetted through nozzle 86. The wetted particulate stream merges with gas stream 80 which acts to dry the wetted particulates that are subsequently handled in the manner discussed with reference to the embodiment of FIGS. 1 and 2.

Figure 8:
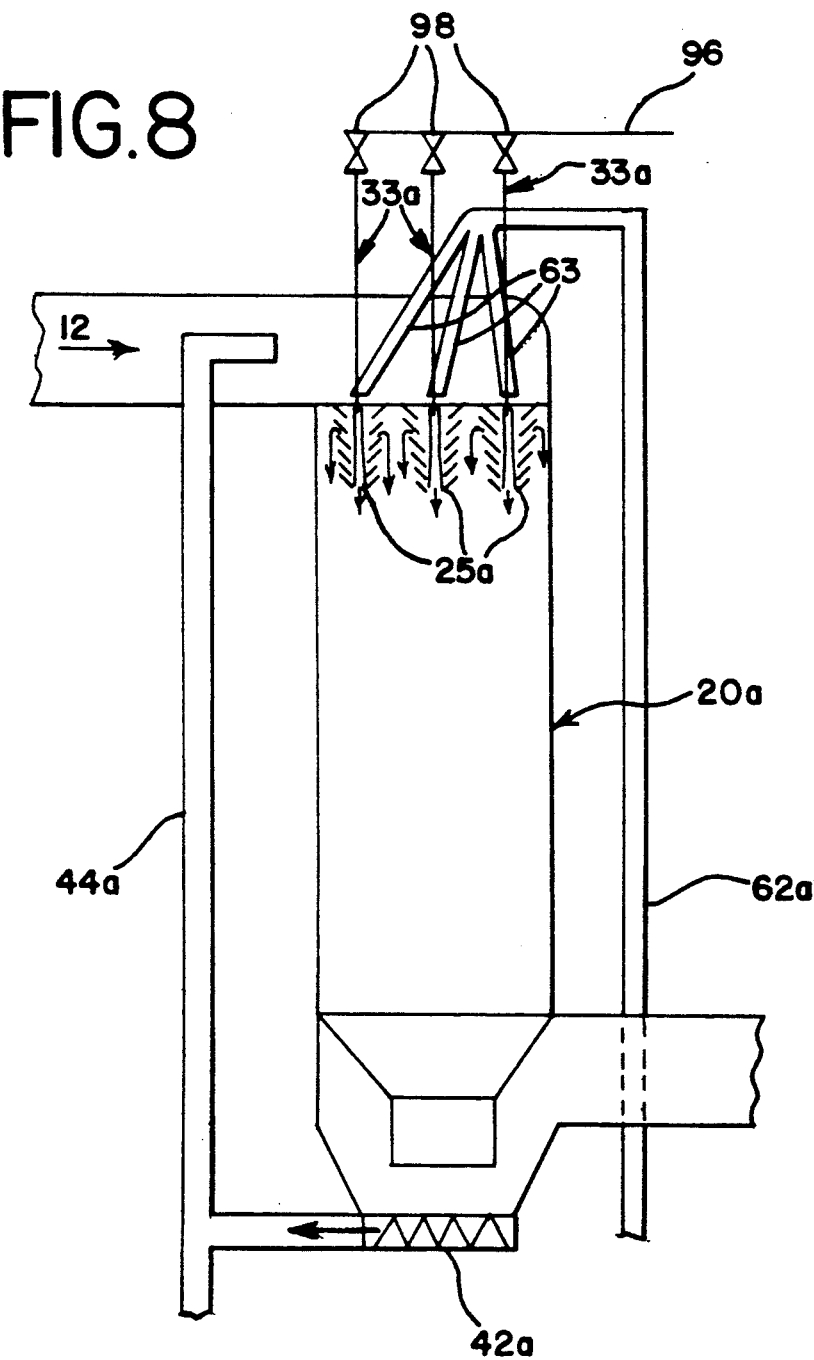
FIG. 8 is a fragmentary diagrammatic view similar to FIG. 1, and illustrating a reactor employing the baffle columns of FIGS. 6 and 7 and a water and recycled particulate distribution assemblage.

Referring to FIGS. 6 through 8, there is illustrated another preferred embodiment of the baffle column 25a and reactor arrangement, wherein like parts are designated by like numerals with the suffix "a." Baffle column 25a comprises a plurality or stack of frusto-conical plates 28a joined together, as by welding, by rods 32a, said plates having central openings 30a decreasing in diameter from top to bottom. Water spray means 33a comprises a water supply pipe extending vertically through the central openings 30a and having a spray nozzle 34a at the lower end thereof. A deflector mantle 90 is supported in the central openings 30a by support rods 92, and said mantle surrounds the lower portion of the water pipe as indicated. It will be noted that the mantle 90 is conical in form and thus serves to produce an annular flow path for the stream 13a and also reduce the cross-sectional area of the openings 30a downwardly through the baffle column. The water spray nozzles 34a may likewise comprise multiple nozzles to insure thorough wetting of the primary stream 13a exiting from the annular opening in the bottom plate 28a.

Water is delivered from above to each of the supply pipes 33a from a main water line 96. Each of the pipes 33a may also be provided with a suitable valve 98 permitting maintenance and/or replacement of the pipes as well as control of volume and pressure of water flow. It will also be noted that line 62a is fitted with an array of delivery tubes 63, said tubes terminating adjacent the tops of the baffle columns 25a. The solid products being recycled from the precipitator are thereby distributed directly to all of the columns to insure most efficient mixing with the stream 12.

It should be appreciated that preferred embodiments of the invention have been described herein for illustrative purposes only and are not otherwise limiting of the structural and process concepts of the invention. Accordingly, changes and variations may be made by those skilled in the art without departing from the spirit and scope of the invention as defined in the appended claims.

What is claimed is:

1. A process for the removal of gaseous sulfur compounds including sulfur dioxide from combustion gases formed in a combustion chamber containing such compounds, said process comprising:

(a) introducing a pulverous alkaline-forming solid into the combustion chamber above the combustion zone to mix with the combustion gases to form a primary stream;

(b) flowing the resulting primary stream of combustion gases comprising sulfur oxides and alkaline oxide solids into a reactor vessel containing a baffle column;

(c) flowing the primary stream through the baffle column to separate said primary stream in said reactor vessel into one or more first streams containing substantially all of said oxide solids and one or more second streams substantially free of said solids;

(d) flowing said first streams past spray nozzles to wet said first streams downstream of the separation of the primary stream into first and second streams;

(e) combining said wetted first streams with said second streams to react hydroxides and sulfur oxides and produce a third stream containing substantially dry sulfates and sulfites;

(f) collecting the dry sulfates or sulfites from the bottom of said reactor vessel; and (g) flowing the essentially desulfurized third stream out of said reactor vessel.

2. A process according to claim 1 wherein step (c) is performed by flowing said primary stream through a plurality of baffle columns thereby separating said primary stream into a plurality of first streams and a plurality of second streams.

3. A process according to claim 2 wherein step (d) is performed by a spray nozzle positioned beneath each of said baffle columns.

4. A process according to claim 2 wherein the temperature of said primary stream is about 150° C. and the temperature of said wetted first streams of step (d) is about 45°–55° C.

5. A process according to claim 4 wherein the temperature of the third stream of step (g) is around 55°–65° C.

6. A process according to claim 5 comprising the step of:

(h) recirculating a portion of the dry sulfates or sulfites and other reaction products back into said primary stream.

7. A process according to claim 6 comprising the steps of:

(i) flowing the desulfurized third stream of step (g) to electrostatic precipitator means and removing solids therefrom; and (j) discharging the third stream from the precipitator means to atmosphere.

8. A process according to claim 7 comprising the step of:

(k) recirculating a portion of the solids from said precipitator back into said primary stream.

9. A process according to claim 8 wherein step (k) is performed through a return line connected to an array of delivery tubes whereby the solids recirculated from the precipitator are distributed directly into each of said baffle columns.

10. A process for removing alkali oxides particles from a primary gas stream containing sulfur oxides and said particles from combustion gases formed in a combustion chamber containing such particles comprising the steps of:

introducing the primary gas stream into a vessel;

separating said primary gas stream within said vessel into a first stream containing substantially all of the alkali oxides particles and a second stream which is substantially particle-free;

wetting said first stream to produce alkali hydroxides; and combining the wetted first stream with the particle-free second stream within said vessel to produce a substantially dry sulfates and sulfites product in said vessel.

* * * * *